(12) United States Patent
Lange et al.

(10) Patent No.: US 7,086,316 B2
(45) Date of Patent: Aug. 8, 2006

(54) VERTICAL LATHE

(75) Inventors: Werner Lange, Hünfelden (DE); Hans Noss, Bad Schwalbach (DE); Hans-Dieter Kellert, Taunusstein (DE)

(73) Assignee: Hessapp GmbH (DE)

( * ) Notice: Subject to any disclaimer, the term of this patent is extended or adjusted under 35 U.S.C. 154(b) by 0 days.

(21) Appl. No.: 11/220,998

(22) Filed: Sep. 7, 2005

(65) Prior Publication Data
US 2006/0048614 A1    Mar. 9, 2006

(30) Foreign Application Priority Data
Sep. 8, 2004  (EP) .................................. 04021279

(51) Int. Cl.
*B23B 9/00* (2006.01)
(52) U.S. Cl. .......................................... 82/122; 82/129
(58) Field of Classification Search .................. 82/129, 82/122, 117, 118, 121, 138, 159; 29/35.5
See application file for complete search history.

(56) References Cited

U.S. PATENT DOCUMENTS

| 4,742,739 | A | 5/1988 | Yamaguchi et al. |
| 5,313,694 | A * | 5/1994 | Yonemoto et al. ........... 29/27 R |
| 6,021,695 | A * | 2/2000 | Kosho et al. ................... 82/122 |
| 6,189,427 | B1 * | 2/2001 | Kosho et al. ................... 82/122 |
| 6,622,600 | B1 * | 9/2003 | Grossmann ................... 82/121 |
| 6,651,535 | B1 * | 11/2003 | Hafla et al. .................... 82/121 |
| 6,760,961 | B1 * | 7/2004 | Upadhya ...................... 29/27 C |

FOREIGN PATENT DOCUMENTS

| DE | 863 434 | 1/1953 |
| DE | 34 16 660 C2 | 11/1985 |
| DE | 199 00 294 B4 | 7/2000 |
| DE | 102 37 191 C2 | 7/2003 |
| DE | 10 2004 012 562.7 | 3/2004 |
| EP | 0 953 403 A2 | 11/1999 |

* cited by examiner

Primary Examiner—Willmon Fridie, Jr.
(74) Attorney, Agent, or Firm—McGlew & Tuttle, P.C

(57) ABSTRACT

A machine frame, at the top of which is disposed a vertically displaceable workpiece-accommodation spindle with a workpiece chucking device. Disposed on the machine frame are a tool holder, displaceable in a horizontal X1 direction, for a tool and another tool holder, displaceable in a horizontal X2 direction as well as in a vertical Z2 direction, for accommodation of a second tool. Displacing the workpiece accommodation spindle, inclusive of its rotary drive, and the displacement drive of the tool holders is implemented by way of a central control unit.

10 Claims, 9 Drawing Sheets

VERTICAL LATHE

CROSS REFERENCE TO RELATED APPLICATIONS

This application claims the benefit of priority under 35 U.S.C. § 119 of European Application EP 04 021 279.7 filed Sep. 8, 2004, the entire contents of which are incorporated herein by reference.

1. Field of the Invention

The invention relates to a vertical lathe, in particular for machining wheels, rims, brake disks, brake drums or the like.

2. Background of the Invention

A vertical lathe is known from DE 34 16 660 C2, in which a workpiece chucking device is mounted on a vertical workpiece accommodation spindle which is mounted on a cross slide that is displaceable in the vertical Z and horizontal X direction. It can move in the X direction between a work-feed area, a discharge area and a machining area. Disposed in the machining area is a tool towards which motions of the workpiece relative to the tool are produced by way of the capability of displacement of the workpiece accommodation spindle in the vertical and horizontal direction. This design is constructionally complicated, in particular not allowing high working rates i.e., short cycle times for a complete machining job inclusive of workpiece feed and discharge.

German patent 863 434 describes a vertical lathe. In the machining area of which, provision is made for several tool holders which are horizontally and vertically displaceable independently of each other.

DE 199 00 294 B4 teaches a vertical lathe that is designed in particular for machining shafts. A workpiece accommodation spindle and an opposite tailstock are vertically adjustable one towards the other for workpieces of varying length to be clamped. Tool holding fixtures are mounted on cross slides on both sides of the axis of rotation of the workpiece accommodation spindle so that machining the shaft throughout its length and radially of the axis of rotation is simultaneously feasible by means of two tools that are drivable independently of each other. This machine is complicated and hardly accessible in particular upon automatic feed.

A vertical lathe is known from DE 102 37 191 C2. The workpiece accommodation spindle of which is movable in the vertical Z direction and horizontal X direction. A first tool is mounted stationarily on the machine frame. The motion of the workpiece relative to the tool is implemented by the biaxial movability of the workpiece. A second tool is movable in the horizontal and vertical direction. Feed and discharge of workpieces takes place by the workpiece accommodation spindle, along with the workpiece, being displaced between a feed and discharge area and a machining area. The design does not permit any short cycle times.

DE 10 2004 012 562.7, which is not a prior disclosure, describes a vertical lathe which comprises two vertically displaceable workpiece accommodation spindles and a horizontally displaceable tool holder that is allocated to each workpiece accommodation spindle. The lathe comprises a feeder to feed workpieces from a rear feed and discharge area where to discharge machined workpieces.

SUMMARY OF THE INVENTION

It is a primary object of the invention to embody an vertical lathe, to machine workpieces by simply and at very short cycle times, and which may optionally be provided with a feeder.

According to the invention, this object is attained in a vertical lathe, comprising a machine frame; a workpiece accommodation spindle disposed on the machine frame, with the spindle, at a bottom end, having a workpiece chucking device for accommodation of a workpiece, and, by a spindle drive motor, being drivable for rotation about a vertical axis of rotation that runs in a Z1 direction, and, by a Z1 drive motor, being displaceable only in the Z1 direction; a first tool holder for accommodation of a first tool, the first tool holder being displaceable by an X1 drive motor only in a horizontal X1 direction; a second tool holder for accommodation of a second tool, the second tool holder being displaceable by an X2 drive motor in a horizontal X2 direction, and by a Z2 drive motor, being displaceable in a vertical Z2 direction; a control unit for triggering the spindle drive motor, the Z1 drive motor, the X1 drive motor, the X2 drive motor and the Z2 drive motor during rotary machining of the workpiece. The motion of the workpiece relative to the first tool in the Z1 and X1 direction is attained by controlled displaceability of the workpiece accommodation spindle only in the Z1 direction and by the first tool holder being displaceable only in the X1 direction. The motion of the second tool relative to the workpiece is attained by the tool being displaceable in the X2 direction on the one hand and by the superimposed motions of the workpiece accommodation spindle in the Z1 direction and of the second tool in the Z2 direction on the other hand. So the first tool holder is movable only on one plane. Coordination of the entire triggering jobs during the machining process takes place via a central control unit, as a rule a CNC. The lathe is open downwards in the machining area, excellent chip removal being possible, which is important in particular with materials that tend to catch fire, such as magnesium.

Advantageous constructional designs reside in the first tool holder being disposed on an X1 carriage which is displaceable only horizontally in the X1 direction; in the second tool holder being disposed on a cross slide which is displaceable horizontally in the X2 direction and vertically in the Z2 direction; and in the Z1 direction, the X1 direction, the X2 direction and the Z2 direction spanning a common X–Z plane where the axis of rotation and places of engagement of the tools are located. The development wherein the first tool and the second tool are disposed on sides, turned towards each other, of the X1 carriage and of the cross slide ensures favorable and unimpeded chip discharge.

The further embodiment enables a feeder to be provided optionally, which is disposed crosswise of the X–Z plane. The feeder is guided in a feed tube of the machine frame towards the machining area, which is an especially simple way of design. When the feeder comprises a first feeding skid with a first workpiece seat and a first skid-travel motor, and a second feeding skid with a second workpiece seat and a second skid-travel motor; and when the first skid-travel motor and the second skid-travel motor are triggered by the control unit for discharge of a machined workpiece and for feed of a workpiece that is to be machined, these measures enable such a feeder to be arranged optionally.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
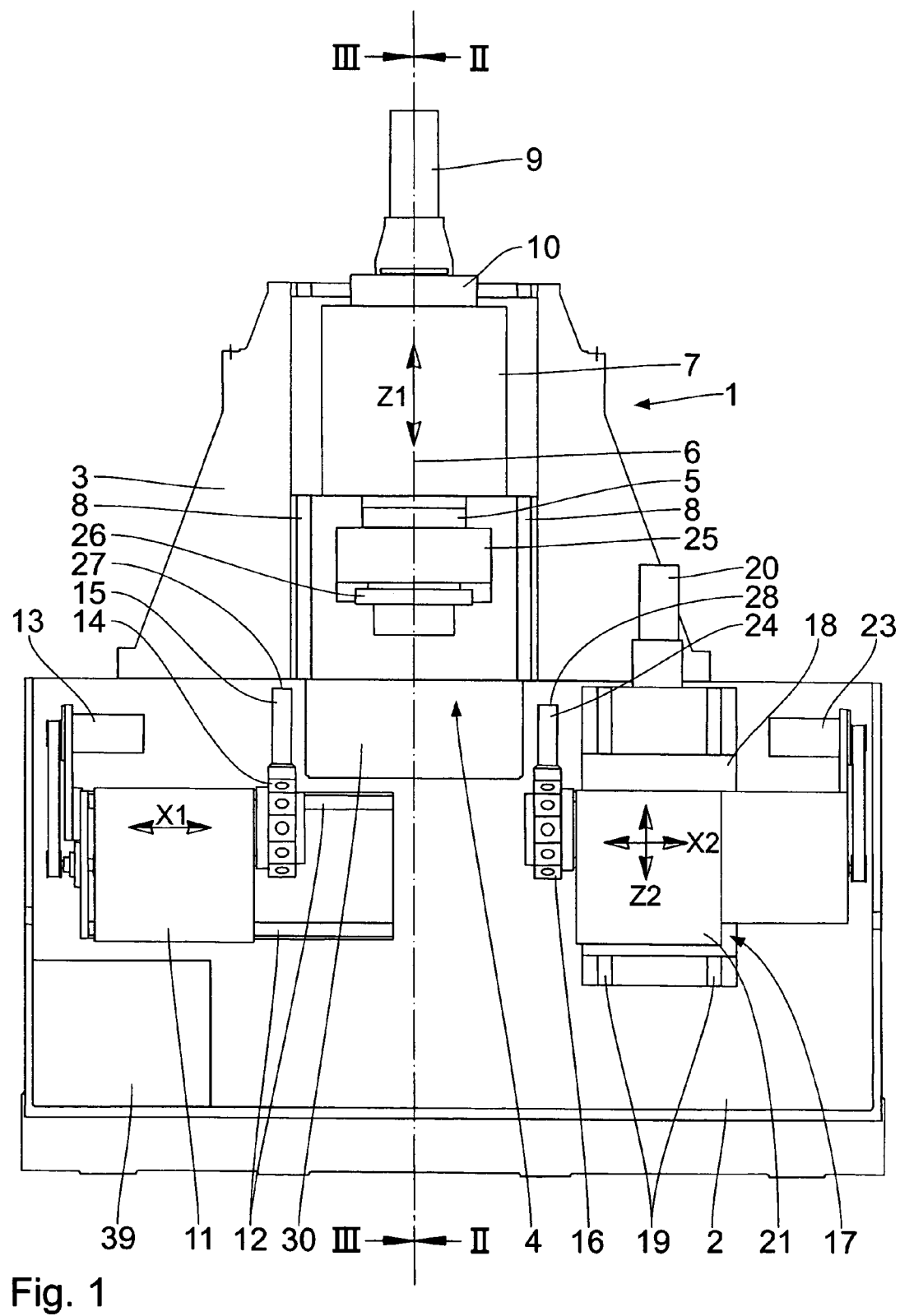
FIG. 1 is a front view of a vertical lathe according to the invention without a feeder.

Referring to the drawings in particular, the vertical lathe includes a machine frame 1 which is comprised of a substantially cuboidal bottom frame 2 and a top frame 3 placed thereon, the two of them being integrally united. A machining area 4 is located at the front of the machine frame 1. A workpiece accommodation spindle 5 is mounted on the top frame 3 in the machining area 4, its axis of rotation 6 being vertical. It is located on a spindle carriage 7 which is vertically displaceable on tracks 8 that are mounted on the top frame 3. Actuation of the carriage 7 for displacement in a vertical Z1 direction takes place by means of an electric Z1 drive motor 9 that is mounted on the top frame 3. Rotary actuation of the spindle 5 takes place by means of an electric spindle drive motor 10 which is mounted of the carriage 7. The carriage 7 and the spindle 5 are situated approximately in the middle of the machine frame 1 as seen from the machining area 4. The spindle 5 is movable only vertically.

An X1 carriage 11, which is horizontally displaceable in the X1 direction, is located on the bottom frame 2; it is mounted for displacement on horizontal tracks 12. Actuation for displacement takes place by means of an electric X1 drive motor 13 which is mounted on the bottom frame 2. A first tool holder 14 of the type of a turret is mounted on the X1 carriage 11 on the side turned towards the axis of rotation 6; it can optionally accommodate varying first tools 15.

A second tool holder 16 is provided in mirror symmetry to the first tool holder 14; it is mounted on a cross slide 17. The cross slide 17 comprises a Z2 carriage 18 which is displaceable in the Z2 direction; it is mounted on the bottom frame 2 for displacement in the vertical Z2 direction on tracks 19. Actuation of the Z2 carriage takes place by means of an electric Z2 drive motor 20 that is mounted on the bottom frame 2. An X2 carriage 21 is located on the Z2 carriage 18 for displacement on tracks 22 in the horizontal X2 direction. Actuation for displacement takes place by means of an electric X2 drive motor 23 which is mounted on the Z2 carriage 18. The second tool holder 16 is mounted on the X2 carriage 21 on the side turned towards the axis of rotation 6. It is embodied in the same way as the first tool holder 14, serving for optional accommodation of varying second tools 24.

On the bottom side of the workpiece accommodation spindle 5, provision is made for a workpiece chucking device 25 for accommodation of a workpiece 26 which is to be machined. The vertical axis of rotation 6 and the place of engagement 27 of the first tool 15 and the place of engagement 28 of the second tool 24 are on a common vertical X–Z plane.

Figure 2:
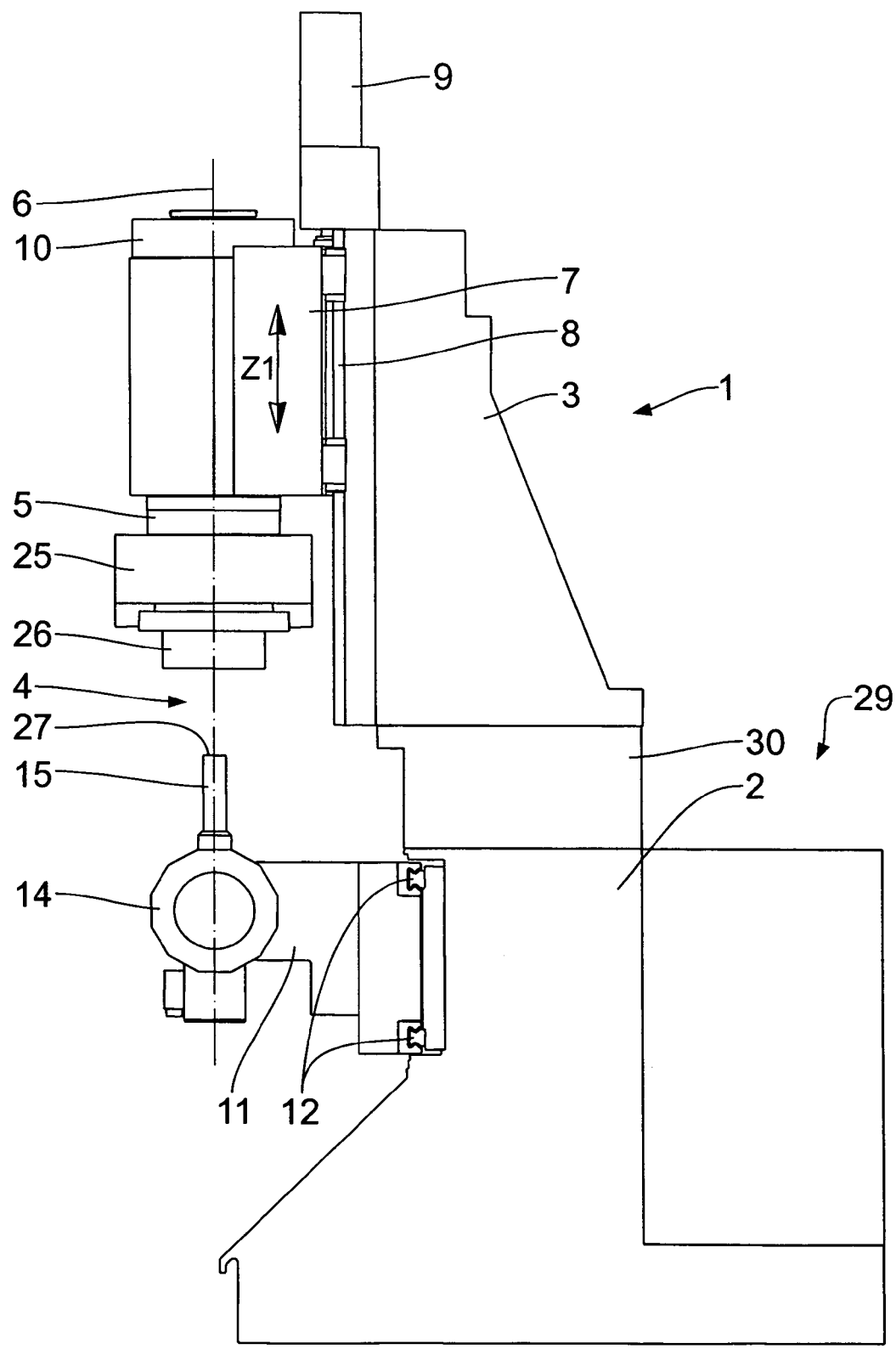
FIG. 2 is a vertical cross-sectional view of the lathe on the line II—II of FIG. 1.
Figure 3:
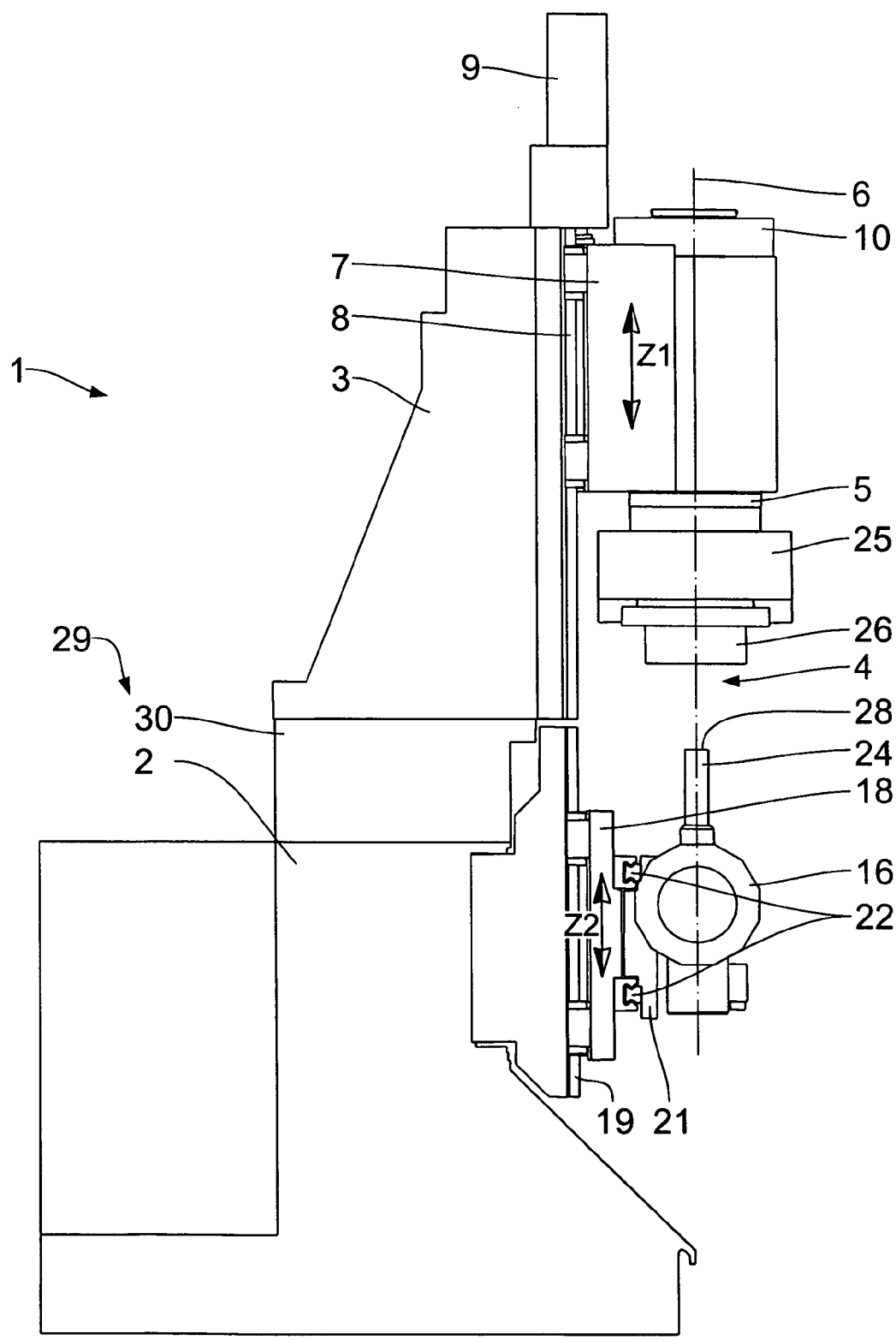
FIG. 3 is a vertical cross-sectional view of the lathe of FIG. 1 on the line III—III of FIG. 1.
Figure 4:
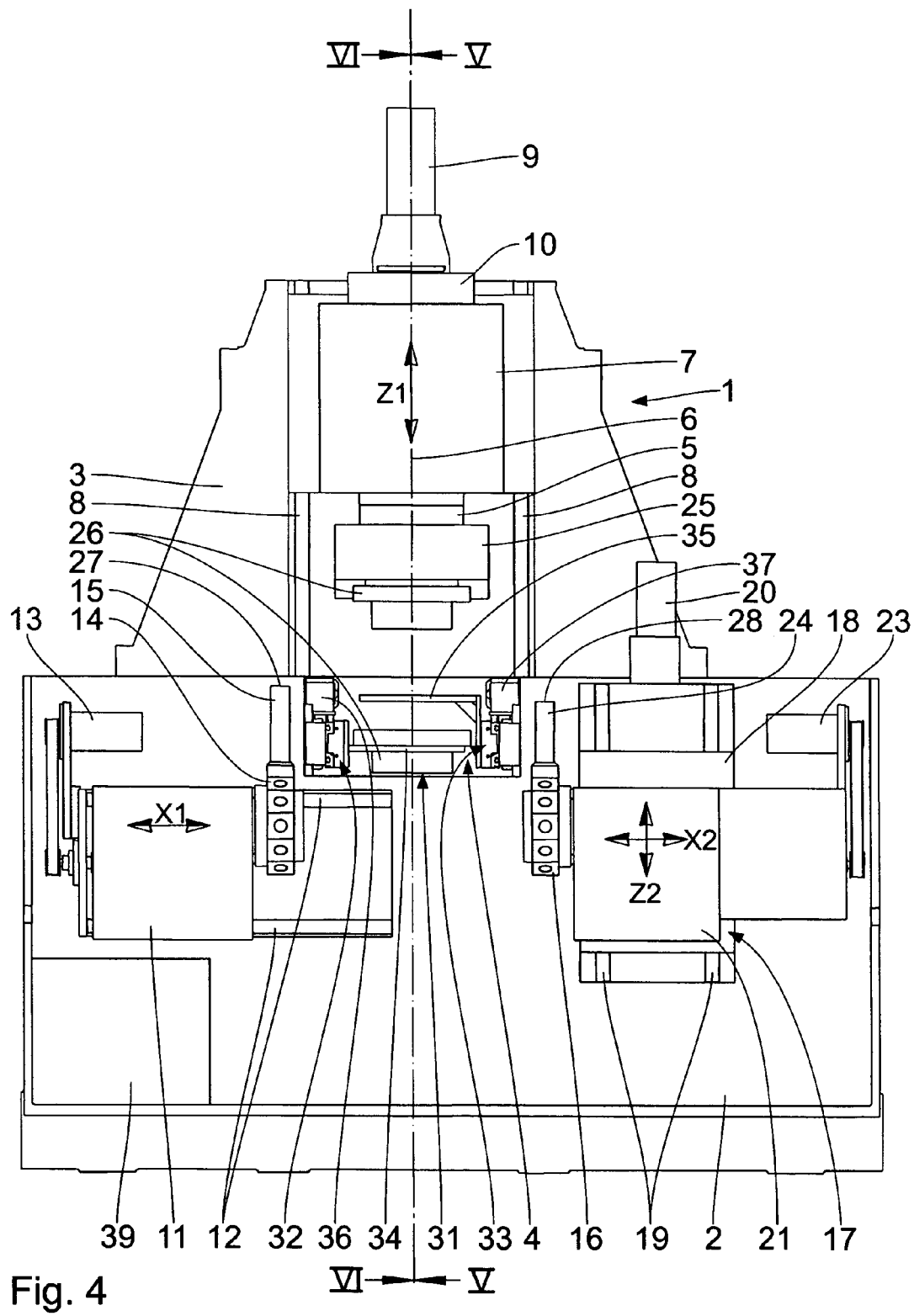
FIG. 4 is a front view of a lathe according to the invention, which differs from the lathe seen in FIGS. 1 to 3 by an additional feeder.
Figure 5:
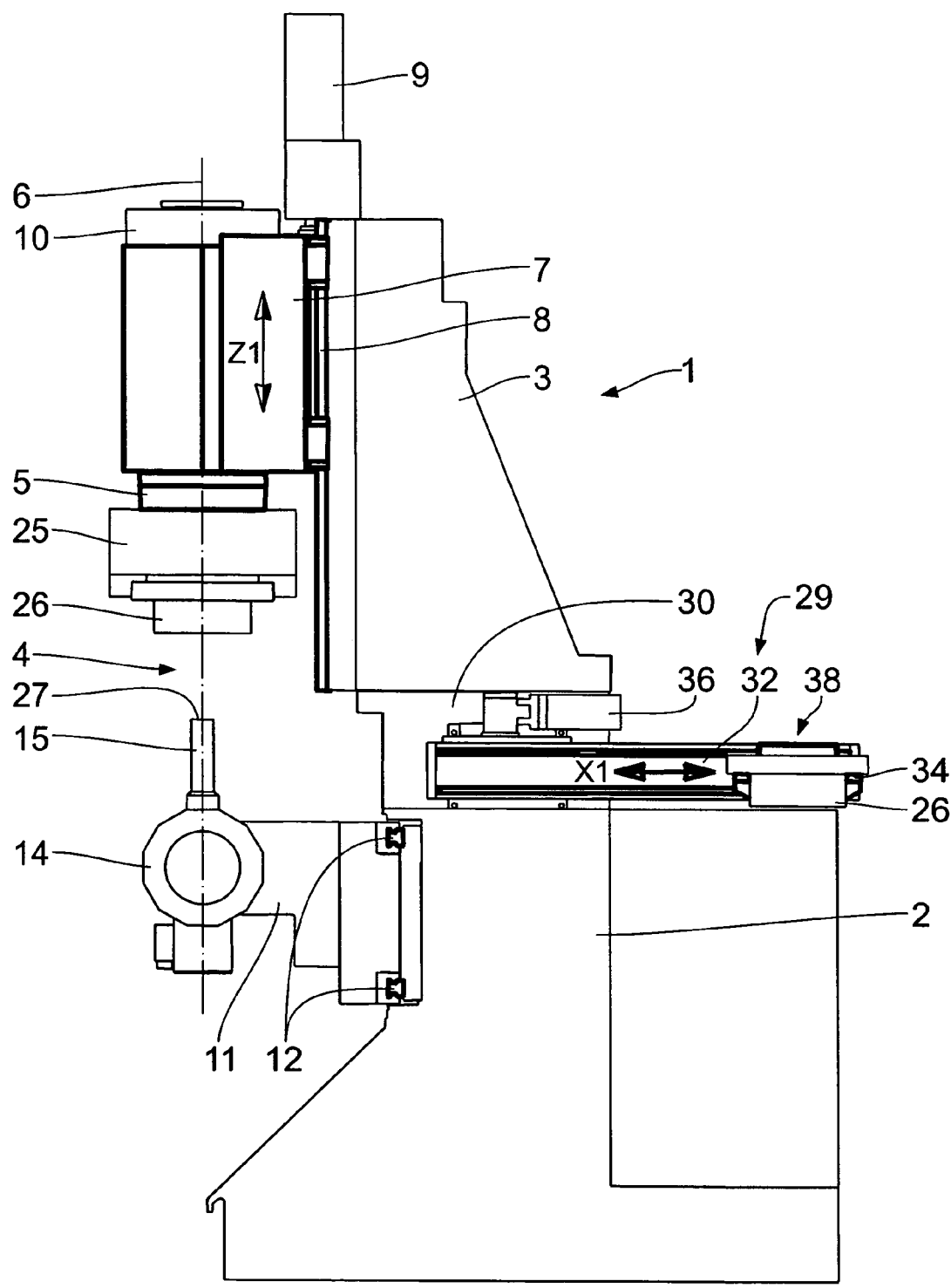
FIG. 5 is a vertical cross-sectional view of the lathe of FIG. 4 on the line V—V of FIG. 4.
Figure 6:
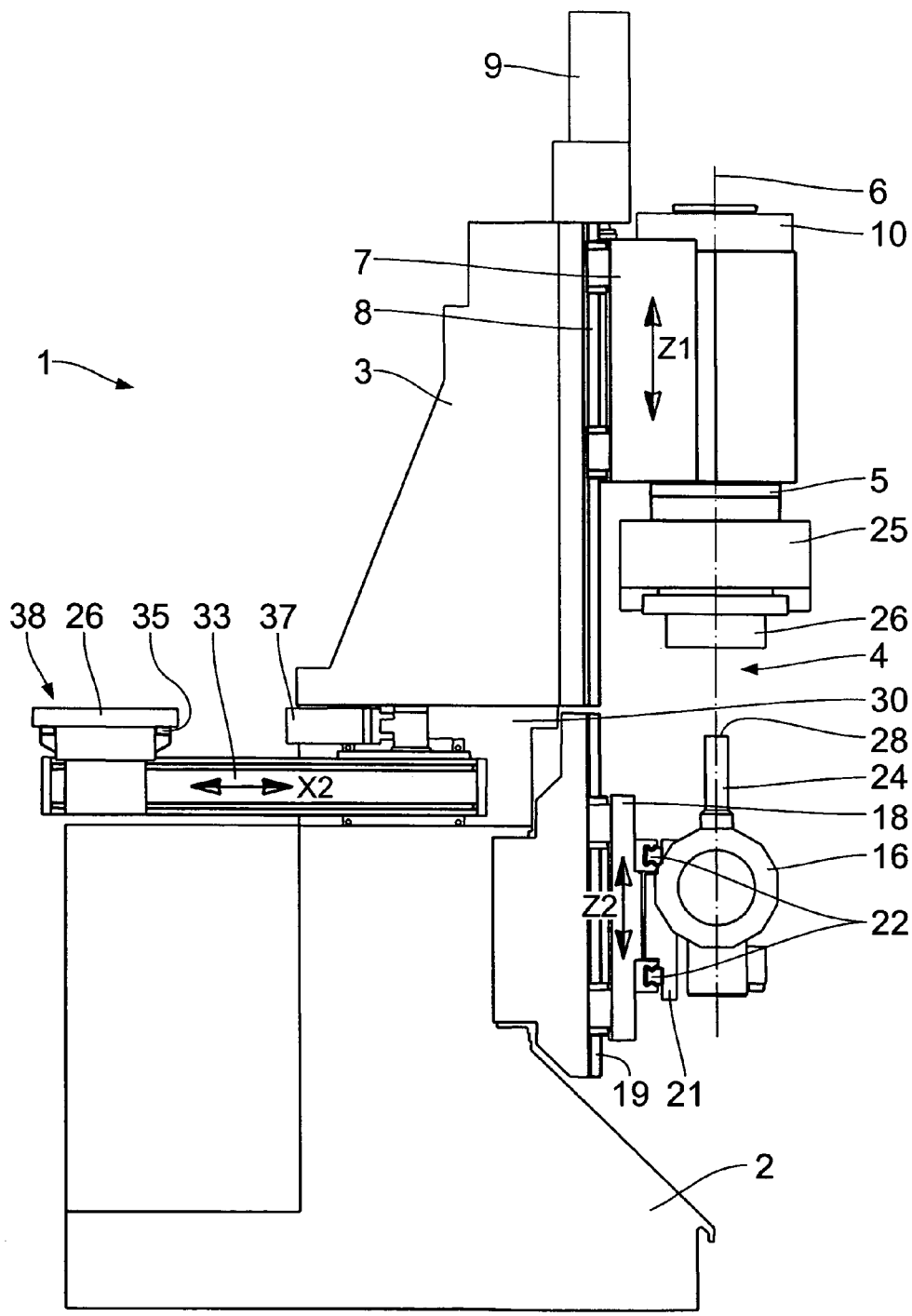
FIG. 6 is a vertical cross-sectional view of the lathe of FIG. 4 on the line VI—VI of FIG. 4.

A feeding tube 30, which may optionally house a feeder 31, passes from the machining area 4 to a feed and discharge area 38 at the rear 29 of the machine frame 1. While such a feeder is not provided in the embodiment according to FIGS. 1 to 3, a feeder 31 is available in the embodiment of FIGS. 4 to 6. It comprises a first feeding skid 32 and a second feeding skid 33 which have a first workpiece seat 34 and a second workpiece seat 35. The feeding skids 32, 33 are drivable by a first skid-travel motor 36 and a second skid-travel motor 37. As seen in particular in FIG. 4, the workpiece seats 34, 35 are disposed one on top of the other in the Z1 direction so that they can be moved towards each other. The feeding skids 32, 33 are of telescoping design so that the workpiece seats 34, 35 can be displaced from the rear feed and discharge area 38 to the machining area 4 and in the opposite direction. These embodiments of the feeding skids 32 and 33 are known.

Triggering the numerous drives, namely the Z1 drive motor 9, the spindle drive motor 10, the X1 drive motor 13, the Z2 drive motor 20, the X2 drive motor 23, the workpiece chucking device 25 and, possibly, the skid-travel motors 36, 37 takes place by means of a control unit 39 (roughly outlined) which is customarily a CNC.

Figure 7:
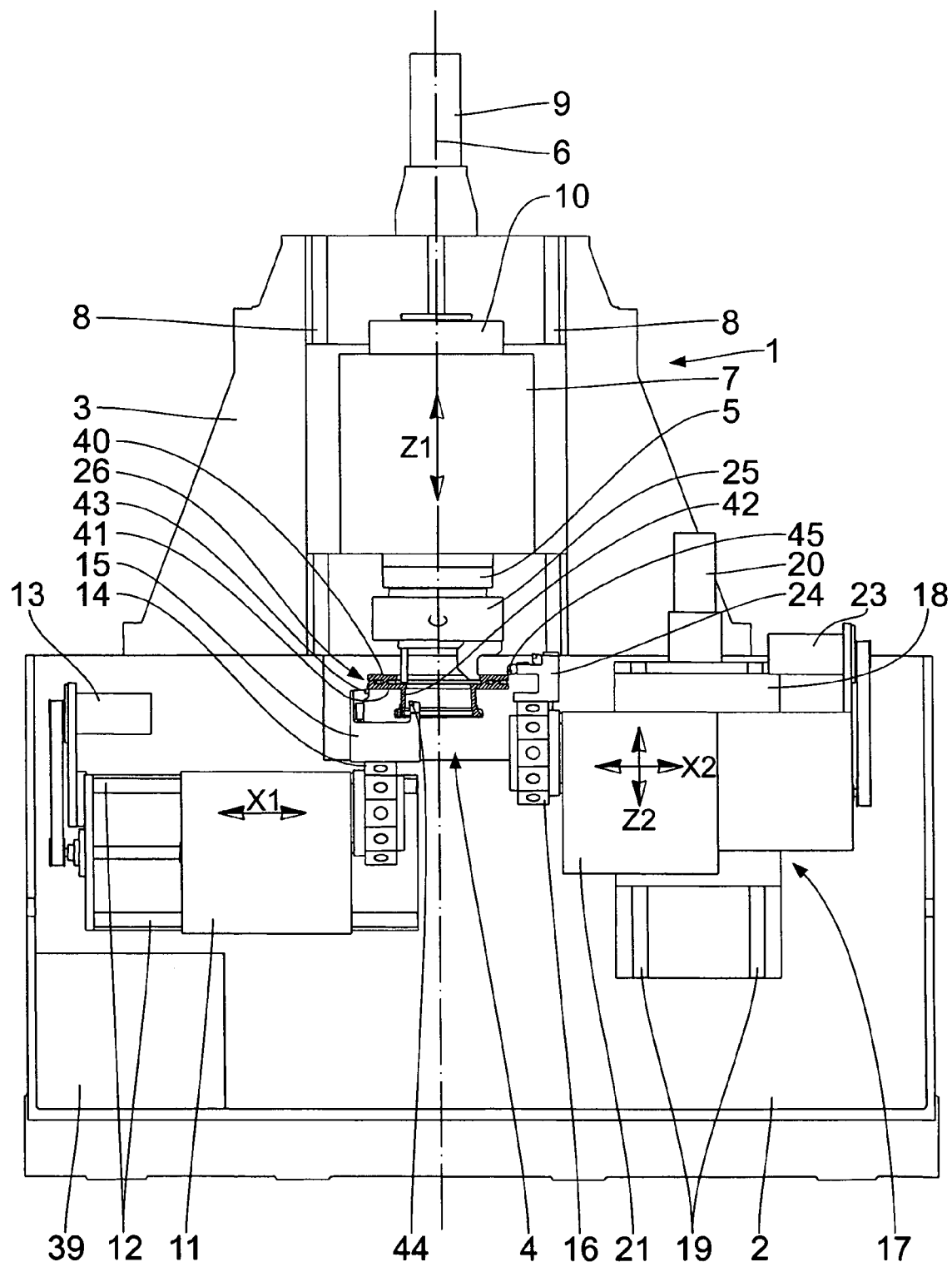
FIG. 7 is an illustration, according to FIGS. 1 and 4, of a lathe upon machining of a workpiece.

The machining of a workpiece 26 can be seen from FIG. 7, the workpiece 26 there shown being a brake disk. It comprises a plane top braking surface 40, a plane bottom braking surface 41 and an inside cylindrical centering surface 42, all of which must be machined. The first tool 15 is a double tool i.e., it has a first cutting edge 43 for machining the bottom braking surface 41 and a second cutting edge 44 for machining the centering surface 42. The second tool 24 has a cutting edge 45 that serves for machining the top braking surface 40.

Machining takes place in such a way that the X1 carriage 11, together with the workpiece 26, is being moved in the X1 direction underneath the workpiece 26. The workpiece 26 is being actuated for rotation about the axis of rotation 6, and the spindle carriage 7 is being moved downwards in the Z1 direction. In doing so, the second cutting edge 44 machines the centering surface 42. Then the first cutting edge 43 machines the bottom braking surface 41 and the cutting edge 45 machines the top braking surface 40. To this end, the carriage 7 has been moved in the Z1 direction into a position that corresponds to the position of engagement of the first cutting edge 43 for machining the bottom braking surface 41. By displacement of the Z2 carriage 18, the cutting edge 45 is being moved into a position that is necessary for machining the top braking surface 40. Then, with the spindle carriage 7 being at rest, the X1 carriage 11 and the X2 carriage 21 are being moved in a direction towards the axis of rotation 6, as a result of which the bottom braking surface 41 and the top braking surface 40 are being worked simultaneously. Of course, any kinds of superimposed motions are possible as well.

Figure 8:
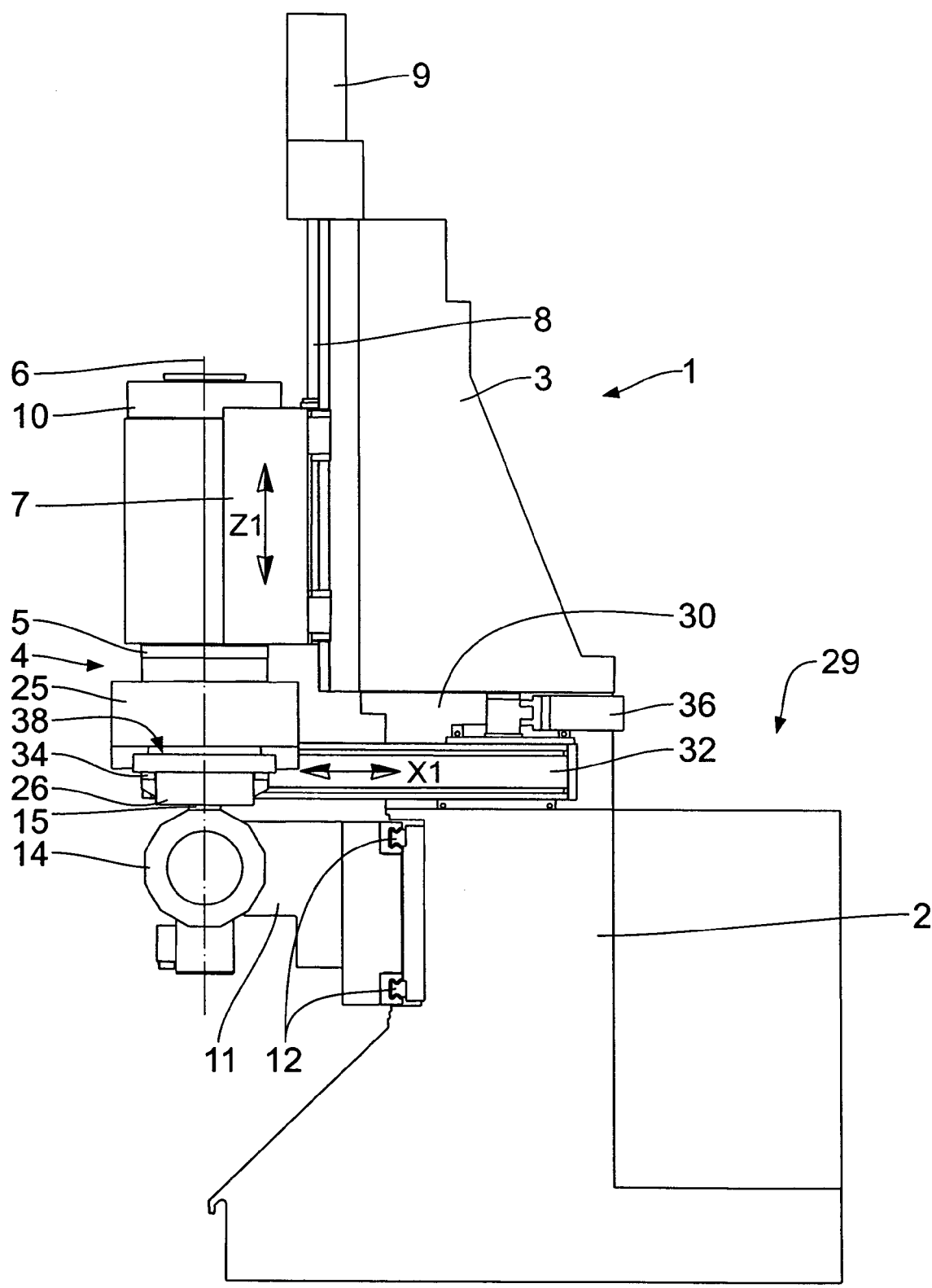
FIG. 8 is an illustration, according to FIG. 5, of a lathe upon removal of a machined workpiece.
Figure 9:
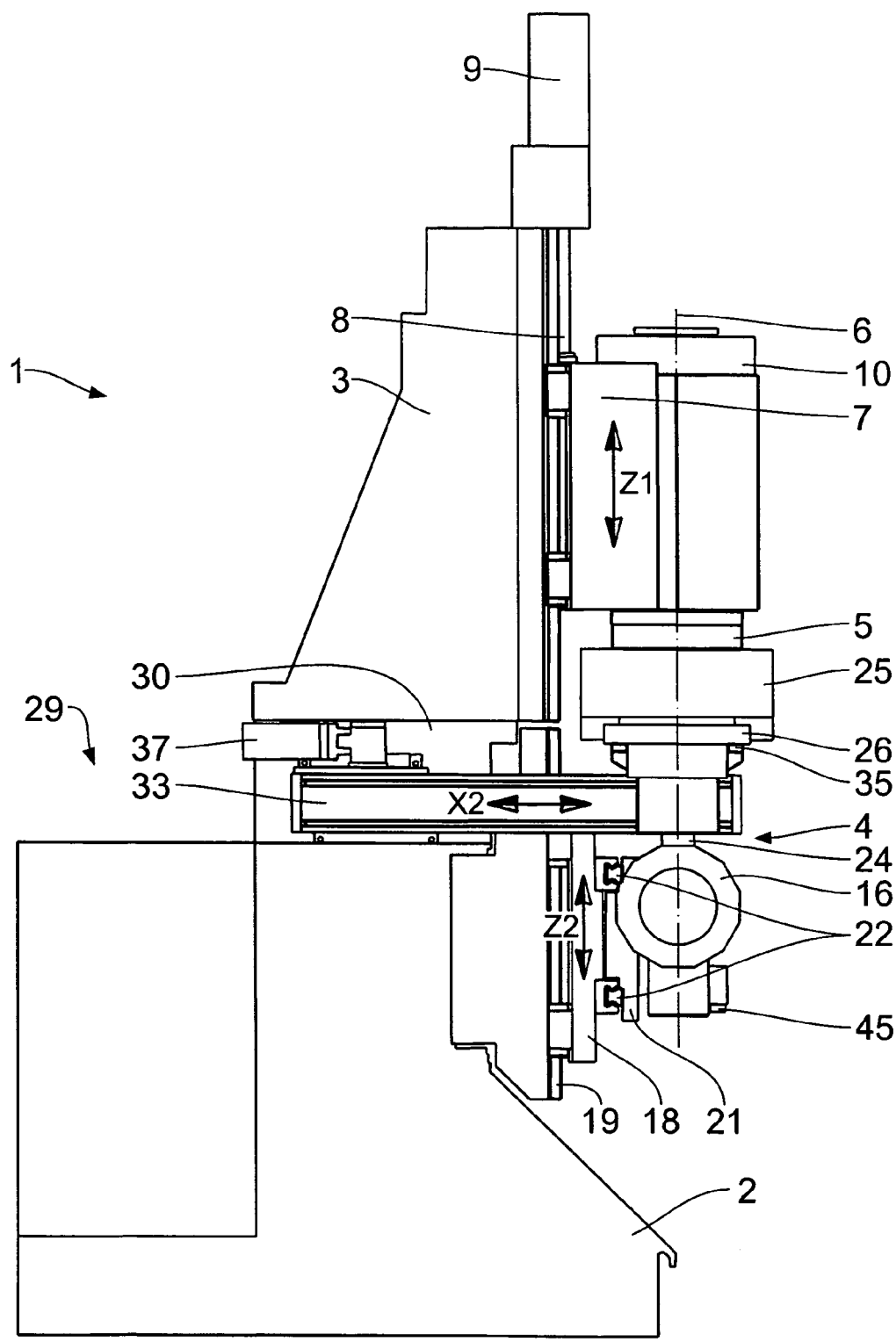
FIG. 9 is an illustration, according to FIG. 6, of a lathe upon feed of a workpiece for machining.

When the workpiece chucking device 25 is not being fed manually or frontally by a robot or the like, but instead by means of the feeder 31, this is carried out as follows:

As seen in FIG. 8, for removal of a finished workpiece, the first feeding skid 32, together with the first workpiece seat 34, has been moved into the machining area 4. The spindle 5 is being moved downwards and the workpiece 26 is being deposited into the first workpiece seat 34. The second feeding skid 33, together with another workpiece 26 that is to be machined, is already in a position of standby upstream of the machining area 4, moving into this area 4 after the workpiece accommodation spindle 5 has been sufficiently displaced upwards in the Z1 direction. The workpiece chucking device 25 takes up the other workpiece 26 and the next machining job may take place promptly. Meanwhile the tools 15 and 24 have been moved from their final position at the end of a machining job into their initial position. The next machining job can start promptly.

Upon transfer of the workpiece 26 that is to be machined to the workpiece chucking device 25, the machined workpiece is being displaced by the first feeding skid 32 into the feed and discharge area 38, where it is withdrawn from the first workpiece seat 34. Another workpiece is being placed for machining into the first workpiece seat 34. The first workpiece seat 34 again promptly moves into the position of standby downstream of the machining area 4.

After the transfer, as described above, of the workpiece 26, located in the second workpiece seat 35, to the workpiece chucking device 25, the second workpiece seat 35 moves into a position of standby downstream of the machining area 4, being immediately available for accommodation of the workpiece 26, located in the workpiece chucking device 25, once it has been finished.

Of course, the task of the feeder 31 can just as well be controlled in such a way that a feeding skid 32 or 33, together with the associated workpiece seat 34 or 35, regularly serves for the feed of a workpiece 26 that is to be machined, while the other feeding skid 33 or 32, together with the workpiece seat 35 or 34, can only be used for the discharge of a finished workpiece 26.

While specific embodiments of the invention have been shown and described in detail to illustrate the application of the principles of the invention, it will be understood that the invention may be embodied otherwise without departing from such principles.

What is claimed is:

1. A vertical lathe comprising:
   a machine frame;
   a workpiece accommodation spindle disposed on said machine frame;
   a workpiece chucking device at a bottom end of said spindle for accommodation of a workpiece;
   a spindle drive motor drivable for rotation of said spindle about a vertical axis of rotation that runs in a Z1 direction;
   a Z1 drive motor displaceable of said spindle only in said Z1 direction;
   a first tool holder for accommodation of a first tool;
   an X1 drive motor displaceable of said first tool holder only in a horizontal X1 direction;
   a second tool holder for accommodation of a second tool;
   an X2 drive motor displaceable of said second tool holder in a horizontal X2 direction;
   a Z2 drive motor (20), displaceable of said second tool holder in a vertical Z2 direction; and
   a control unit for triggering said spindle drive motor, said Z1 drive motor, said X1 drive motor, said X2 drive motor, and said Z2 drive motor during rotary machining of the workpiece.

2. A vertical lathe according to claim 1, wherein:
   the first tool holder is disposed on an X1 carriage which is displaceable only horizontally in said X1 direction.

3. A vertical lathe according to claim 2, wherein:
   the second tool holder is disposed on a cross slide which is displaceable horizontally in said X2 direction and vertically in said Z2 direction.

4. A vertical lathe according to claim 1, wherein:
   said Z1 direction, said X1 direction, said X2 direction and said Z2 direction span a common X–Z plane where said axis of rotation and places of engagement of the tools are located.

5. A vertical lathe according to claim 3, wherein:
   the first tool and the second tool are disposed on sides, turned towards each other, of said X1 carriage and of said cross slide.

6. A vertical lathe according to claim 1, wherein:
   a feeder is provided on said frame crosswise of said X–Z plane.

7. A vertical lathe according to claim 6, wherein:
   said feeder is guided in a feed tube of said machine frame towards said machining area.

8. A vertical lathe according to claim 6, wherein:
   said feeder includes a first feeding skid with a first workpiece seat and a first skid-travel motor, and includes a second feeding skid with a second workpiece seat and a second skid-travel motor, said first skid-travel motor and said second skid-travel motor being triggered by said control unit for discharge of a machined workpiece and for feed of a workpiece that is to be machined.

9. A vertical lathe according to claim 8, wherein:
   said first workpiece seat and said second workpiece seat are disposed one on top of said each other in said Z1 direction.

10. A lathe comprising:
    a machine frame;
    a workpiece spindle arranged on said machine frame;
    a workpiece chucking device arranged at one end of said spindle for accommodation of a workpiece;
    a spindle drive motor connected to said spindle and rotating said spindle about a substantially vertical axis of rotation in a Z1 direction;
    a Z1 drive motor connected to said frame and moving said spindle in said Z1 direction;
    a first tool holder arranged on said frame for accommodation of a first tool;
    an X1 drive motor arranged on said frame for moving said first tool holder in a substantially horizontal X1 direction;
    a second tool holder arranged on said frame for accommodation of a second tool;
    an X2 drive motor arranged on said frame for moving said second tool holder in a substantially horizontal X2 direction;
    a Z2 drive motor arranged on said frame for moving said second tool holder in a substantially vertical Z2 direction;
    a control unit operating said spindle drive motor, said Z1 drive motor, said X1 drive motor, said X2 drive motor, and said Z2 drive motor during rotary machining of the workpiece.

* * * * *